(12) United States Patent
Oldridge

(10) Patent No.: US 10,065,627 B2
(45) Date of Patent: Sep. 4, 2018

(54) ELECTRIC VEHICLE POWER MANAGEMENT DRIVER CONTROL SYSTEM

(71) Applicant: THOMSON POWER INC., Vancouver (CA)

(72) Inventor: David Oldridge, Victoria (CA)

(73) Assignee: Thomson Power Inc., Vancouver, BC (CA)

( * ) Notice: Subject to any disclaimer, the term of this patent is extended or adjusted under 35 U.S.C. 154(b) by 0 days.

(21) Appl. No.: 15/104,975

(22) PCT Filed: Dec. 3, 2014

(86) PCT No.: PCT/CA2014/051160
§ 371 (c)(1),
(2) Date: Jun. 16, 2016

(87) PCT Pub. No.: WO2015/089650
PCT Pub. Date: Jun. 25, 2015

(65) Prior Publication Data
US 2016/0318501 A1    Nov. 3, 2016

(30) Foreign Application Priority Data

Dec. 16, 2013   (CA) ..................... 2836450

(51) Int. Cl.
*B60W 20/10* (2016.01)
*B60L 15/20* (2006.01)
(Continued)

(52) U.S. Cl.
CPC ......... *B60W 20/10* (2013.01); *B60L 15/2045* (2013.01); *B60W 20/12* (2016.01); *B60W 10/06* (2013.01); *B60W 10/08* (2013.01); *B60W 10/18* (2013.01); *B60W 10/26* (2013.01); *B60W 30/18118* (2013.01); *B60W 30/18127* (2013.01);
(Continued)

(58) Field of Classification Search
CPC .. B60W 20/10; B60W 20/12; B60W 2530/00; B60W 10/26; B60W 30/18118; B60W 30/18127; B60W 10/08; B60W 2550/142; B60W 2550/147; B60W 10/18; B60W 10/06; B60L 15/2045;
(Continued)

(56) References Cited

U.S. PATENT DOCUMENTS

| | | | | |
|---|---|---|---|---|
| 9,327,712 B2* | 5/2016 | Matthews | ............. | B60W 20/00 |
| 2009/0140698 A1* | 6/2009 | Eberhard | ................ | H02J 7/045 |
| | | | | 320/152 |
| 2009/0143929 A1* | 6/2009 | Eberhard | ................ | H02J 7/045 |
| | | | | 701/22 |
| 2013/0015860 A1* | 1/2013 | Crombez | ............... | G01R 31/36 |
| | | | | 324/433 |

(Continued)

*Primary Examiner* — Jason Holloway (57) ABSTRACT

An adaptive power management and driver control system for modifying electric vehicle drive output in real time, comprising input sensors mounted on a vehicle that measure a plurality of conditions for the vehicle from among vehicle mass, road grade, vehicle speed, vehicle acceleration, and door position, together with a digital electronic controller mounted on the vehicle that receives data from the input sensors, runs an algorithm using the data, and outputs resulting energy efficient power output commands to an electric motor for the vehicle. The sensors measure at least vehicle mass and road grade. Energy efficiency and reduced charging requirements for the batteries result for a given route for the electrically driven vehicle.

20 Claims, 5 Drawing Sheets

(51) Int. Cl.
*B60W 20/12* (2016.01)
*B60W 10/06* (2006.01)
*B60W 10/08* (2006.01)
*B60W 10/18* (2012.01)
*B60W 10/26* (2006.01)
*B60W 30/18* (2012.01)

(52) U.S. Cl.
CPC ... *B60W 2530/00* (2013.01); *B60W 2550/142* (2013.01); *B60W 2550/147* (2013.01); *Y02T 10/645* (2013.01); *Y02T 10/7283* (2013.01); *Y10S 903/906* (2013.01); *Y10S 903/93* (2013.01)

(58) Field of Classification Search
CPC ............... Y10S 903/93; Y10S 903/906; Y02T 10/7283; Y02T 10/645
See application file for complete search history.

(56) References Cited

U.S. PATENT DOCUMENTS

| | | | | |
|---|---|---|---|---|
| 2013/0221916 A1* | 8/2013 | Kelty | ................... | B60L 11/187 320/109 |
| 2013/0221928 A1* | 8/2013 | Kelty | ................... | B60L 11/187 320/134 |
| 2015/0298680 A1* | 10/2015 | Matthews | ............ | B60W 20/00 701/22 |

* cited by examiner

ELECTRIC VEHICLE POWER MANAGEMENT DRIVER CONTROL SYSTEM

FIELD OF INVENTION

The present invention relates to an adaptive power management & driver control system for electric and range-extended electric vehicles such as buses, cargo trucks and equivalent vehicles.

BACKGROUND OF THE INVENTION

Electric vehicles are propelled by an electric drivetrain powered by an electrochemical battery as an energy storage device. Range extended electric vehicles (serial hybrid) are propelled by an electric drivetrain powered by an electrochemical battery which is recharged by a small internal combustion engine (ICE) such as a generator to extend vehicle range when the energy in the storage device becomes sufficiently depleted.

Electric vehicle performance is inherently sensitive to vehicle mass, energy efficiency, component weight, parasitic loads, power management, thermal and solar loads; all of which are well known and can be accounted for during vehicle design.

An SAE paper 2012-01-0651 "Fuel Consumption Simulation Model for Transit Buses Based on Real Operating Condition to Assist Bus Electrification" found that the operating fuel economy of (Winnipeg, Manitoba Canada) transit buses depended on a number of factors, including the fuel consumption characteristics of the engine, transmission characteristics, weight of the vehicle (which varies with passenger load changes), aerodynamic resistance, rolling resistance of the tires, driving cycle conditions, and driver behavior.

When a transit bus pulls into a bus stop passengers typically will disembark and embark the vehicle. At every bus stop, the passenger load changes along with the vehicle power requirements. The maximum passenger load recorded during the study was 89 with a minimum of zero, and the average passenger load was 12. Passenger load variations in this case affected the vehicle mass by 5785 kg or 89 passengers at an assumed weight of 68 kg per passenger. For example, the New Flyer D40LF transit bus from the study has a curb weight of 12,301 kg and when fully loaded with 89 passengers, weighs 18,086 kg.

A transit bus propulsion system is sized to provide sufficient power to enable the bus to meet the performance requirements defined by the American Public Transportation Association (APTA) for acceleration, top speed, route, Gross Vehicle Weight Rating (GVWR) and gradeability requirements and to operate all accessories as needed. A transit bus must also be capable of achieving a specified top speed within a given amount of time; 50 mph (80 kph) within 60 seconds on a straight, level road at GVWR, with all accessories operating.

Transit bus minimum gradeability requirements are also well defined. For instance, the propulsion system and drivetrain shall enable the bus to achieve and maintain a speed of 40 mph (64 kph) on a 2½ percent ascending grade and 15 mph (24 kph) on a 10 percent ascending grade continuous over a distance of 2/10 of a mile. Because transit bus performance at GVWR has been defined by APTA you now only have to determine the motor power requirements, which is dependent on the bus characteristics and can be determined by using basic Newtonian mechanics.

An electric transit bus propulsion system should also be equipped with regenerative braking capability, and the braking effort it develops should blend with and augment the vehicle brakes in order to maximize the life of the wearing components in the braking system. The regeneration system should be programmable to allow optimization of the vehicles deceleration and regeneration rate. Actuation of the Anti-lock Braking System (ABS) and/or Anti-Slip Regulation (ASR) must override the operation of the regenerative braking.

The regeneration braking shall become partially engaged with a resulting deceleration of no greater than (0.07 g) when the throttle pedal is completely released. The maximum regeneration rate shall be achieved when brake pedal is depressed prior to engagement of the service brakes, with a maximum resulting deceleration of approximately 0.20 g (APTA) in an empty bus. The resulting decelerations specified include the effects of aero dynamic and rolling resistance. The Canadian Transit Handbook (Canadian Urban Transit Association and Transportation Association of Canada) suggests the desirable Deceleration Rate (normal service) for a standard bus of 1.1(m/s2) or 0.112 g.

The (Winnipeg, Manitoba Canada) study above "SAE paper 2012-01-065" shows passenger load variations affected the vehicle mass by up to 5785 kg. As vehicle mass increases, the resulting lower deceleration rate upon regenerative braking onset correspondingly decreases the rate of return over the same time period the vehicles kinetic energy to the energy storage device from regenerative braking and the overall energy efficiency of the vehicle.

It is typical to have to stop the vehicle in a given distance from the time braking is commenced. In such situations it increases power conservation and consumption efficiency to increase the amount of regenerative braking in proportion to the amount of vehicle mass increase. As vehicle mass is increased it takes more power kW to accelerate the vehicle at the same rate of the lower mass. There is a maximum resulting deceleration of approximately 0.20 g in an empty bus. The deceleration rate will be lower for a fully loaded bus (it takes more energy to slow down) so the vehicle brakes would have to be applied more to maintain the maximum deceleration rate of an empty bus. As the present system continually monitors the gross mass of the vehicle, the system can increase the regeneration rate to maintain the 0.2 g for its increased mass or (X) deceleration rate and increase the amount of energy going back into the battery pack by increasing the regeneration rate and use the vehicle brakes less.

If APTA had set the deceleration rate of 0.2 g in braking a fully loaded bus, it would throw standing passengers off their feet in a lightly loaded bus. The APTA intent was to limit the "Jerk" at retarder or regeneration onset because the only known mass is the empty vehicle.

Once vehicle mass, and road grade and accessory loads become factors used to regulate the amount of power supplied to electric vehicles, vehicle driver performance remains as the sole unknown variable linked to electric vehicle range. Vehicle speed and acceleration are closely related to energy consumption in all electric vehicles. Electric vehicle range depends heavily on driving habits (aggressive vs. smooth acceleration).

For example, driver aggressiveness and its effect on driving range:
 0.04 g average acceleration=120 km range
 0.08 g average acceleration=80 km range
Adaptive power control systems found in the prior art are used primarily with parallel hybrid electric/ICE vehicle designs, but they do not optimize the performance of full electric vehicle power systems or electric batteries supplemented by generators (serial electric). In full electric configurations, unburdened by the weight and complexity of full sized ICE's, the maximum potential of electric vehicle power can be realized, but only if the key variables are managed appropriately, such as driver performance, regenerative braking, vehicle mass, road grade, etc. An Electric Vehicle Power Management System and Driver Control method is needed to both efficiently manage power use and minimize speedy and aggressive driving profiles, thereby maximizing vehicle driving range across a broad spectrum of drivers and conditions typically found in transit bus and freight delivery operations.

BRIEF SUMMARY OF THE INVENTION

The present invention provides an adaptive power management driver control system for full electric and range extended serial electric vehicles such as transit buses and freight delivery vehicles. The system modifies electric vehicle drive output in real time, using:

a) input sensors mounted on a vehicle that measure a plurality of conditions for the vehicle from among vehicle load, road grade, vehicle speed, vehicle acceleration, and door position;

b) a digital electronic controller mounted on the vehicle that receives data from the input sensors, runs an algorithm using the data, and outputs resulting energy efficient power output commands to an electric motor for the vehicle.

The sensors should measure at least vehicle load and road grade. Vehicle load and road grade are measured as a door of the vehicle closes and the algorithm calculates a new power output for the electric vehicle motor based on the vehicle load and road grade. The overall vehicle mass including load is derived for the calculations by adding the vehicle load to its mass without a freight, driver and passenger load. The digital electronic controller calculates that the vehicle is stationary by sampling a vehicle speed sensor, notes that a door of the vehicle is open as indicated by a door position sensor, notes that the door is closed when indicated by the door position sensor, samples a vehicle mass sensor and inclinometer upon noting that a door position has changed from open to closed, and calculates an energy efficient motor torque curve profile that determines a magnitude for a motor control signal that is sent to an electric motor in a drivetrain of the vehicle.

Continual new power outputs are calculated on the fly as the vehicle moves and the road grade changes. The digital electronic controller sends motor control signals to control motor speed. A vehicle speed sensor digitizes vehicle speed data and feeds digitized vehicle speed data back to the digital electronic controller.

A key power management driver control principle is implemented by the controller to ameliorate wasted energy from driver exuberance with the accelerator pedal (inefficient "lead foot" syndrome) by which the energy efficient power output commands limit kW available to a drivetrain for the vehicle regardless of its actual load to kW that would provide acceleration of the vehicle as if it were loaded at its GVWR.

Exceptions to that basic principle are implemented by the controller using an additional power algorithm calculation to provide an increased power output command over a previous power output when the vehicle encounters an uphill grade that requires more power for the vehicle to maintain a desired speed on the uphill grade, and provides a decreased power output command over a previous power output when the vehicle encounters a downhill grade that requires less power for the vehicle to maintain a desired speed on the downhill grade. The sensors include chassis mass sensors from which vehicle load is calculated and an inclinometer from which road grade is calculated.

A gearshift position switch, an accelerator pedal position sensor, and a brake sensor, a door position sensor, a cabin temperature sensor, and an external temperature sensor would all provide usable data to the digital electronic controller for its energy optimization algorithms. A route selector features enables pre-figured anticipated load and grade parameters to be set for the algorithms, subject to variation in real time via sensor output. A Global Positioning Sensor (GPS) may be used to collate the pre-figured parameters as the selected route is taken. The controller may be integrated with a battery management subsystem and a charger that supplies charging electrical current to the battery pack from an electrical power source external to the vehicle, in order to manage the output and recharging of battery pack for the electric motor of the vehicle.

Battery pack charging can be enhanced by regenerative braking that is also managed by the digital electronic controller. Regeneration should start at throttle off, using the current measured vehicle mass and then activate at least one motor acting as a generator on a drivetrain for the vehicle to maintain a constant deceleration rate (g) that maximizes the amount of the return of the vehicles kinetic energy to the energy storage device and the overall energy efficiency of the vehicle.

Electric braking supplied by the traction motor should be smooth and seamless throughout the full braking application until the vehicle comes to a complete stop.

Regenerative braking can also enhance downhill braking. An optimized regenerative braking subsystem of the power management system would detect if the brake pedal is depressed, use the current measured vehicle mass, calculate the vehicle's downhill angle from an inclinometer and then activate at least one braking motor acting as a generator on a drivetrain for the vehicle to the extent it can achieve a deceleration rate (g) for the vehicle that maintains the vehicles measured downhill speed at the time brake application.

The digital electronic controller would also detect a state of charge of a battery pack for the vehicle, calculates an appropriate recharging profile, activate regenerative braking if the state of charge of the battery pack is below a selected charge level, and shunt power to brake resistors if the state of charge of the battery pack is above a selected charge level.

Activation inputs for the braking resistors are connected to a power distribution box and are activated by the digital electronic controller switching at least one solid-state control relay. Output cooling circuits for the brake resistors may be connected to one or both of a generator engine cooling radiator and a cabin-heating radiator.

The digital electronic controller adjusts torque curve and regenerative braking profiles with algorithms depending on battery state of charge, preprogrammed route terrain, vehicle mass, and road grade. The power management system thus utilizes a strategy whereby vehicle drive output is modified in real time depending on input from sensors that measure vehicle load, road grade, vehicle speed & acceleration, and door position. The power management system is implemented by means of a digital electronic controller, preferably based on a distributed network with multiplexing capabilities. The vehicle power required [kW] has a linear relationship to passenger load and road grade. For example a bus that includes the adaptive power management driver control system, would load passengers at a bus stop, calculate the then bus mass (passengers, luggage, and driver, plus the base vehicle mass) and measure the road grade as the doors close. An new initial accordingly, and then ongoing desired drivetrain power output is calculated and commanded, and then a series of subsequent desired drivetrain power output is calculated and implemented based on the new vehicle load and ongoing road grade changes for the bus.

The driver control system limits aggressive driving at any mass below the vehicles GVWR, reducing vehicle power consumption [kW] and increasing vehicle range because less kW/hr are consumed from the battery pack. This feature can also be used to increase power over the initial power algorithm calculation when the bus encounters an uphill grade that requires more power.

The system can include a "hill-holding" subsystem to prevent the vehicle from rolling backwards during the release of the brake and the application of the throttle pedal. The digital electronic controller receives road grade data from an inclinometer mounted on the vehicle and calculates whether to activate the hill-holding subsystem, uses data from a vehicle mass sensor to calculate a vehicle mass, calculates a level of torque required by the vehicle mass and road grade, and sends power output commands to a motor sufficient to hold the vehicle from moving backward on the road grade during a transition from brake pedal off to throttle pedal on.

The adaptive power management driver control system can be enhanced by including a driver interface system comprising a video screen to display information to a driver for the vehicle, showing sensor data and power output level as well as other information such as vehicle speed, system faults, and battery state of charge.

DETAILED DESCRIPTION

All elements of the Electric Vehicle Power Management & Driver Control System will now be introduced by reference to drawing figures below, and then how each element functions and interacts with each other element will be described where necessary.

Figure 1:
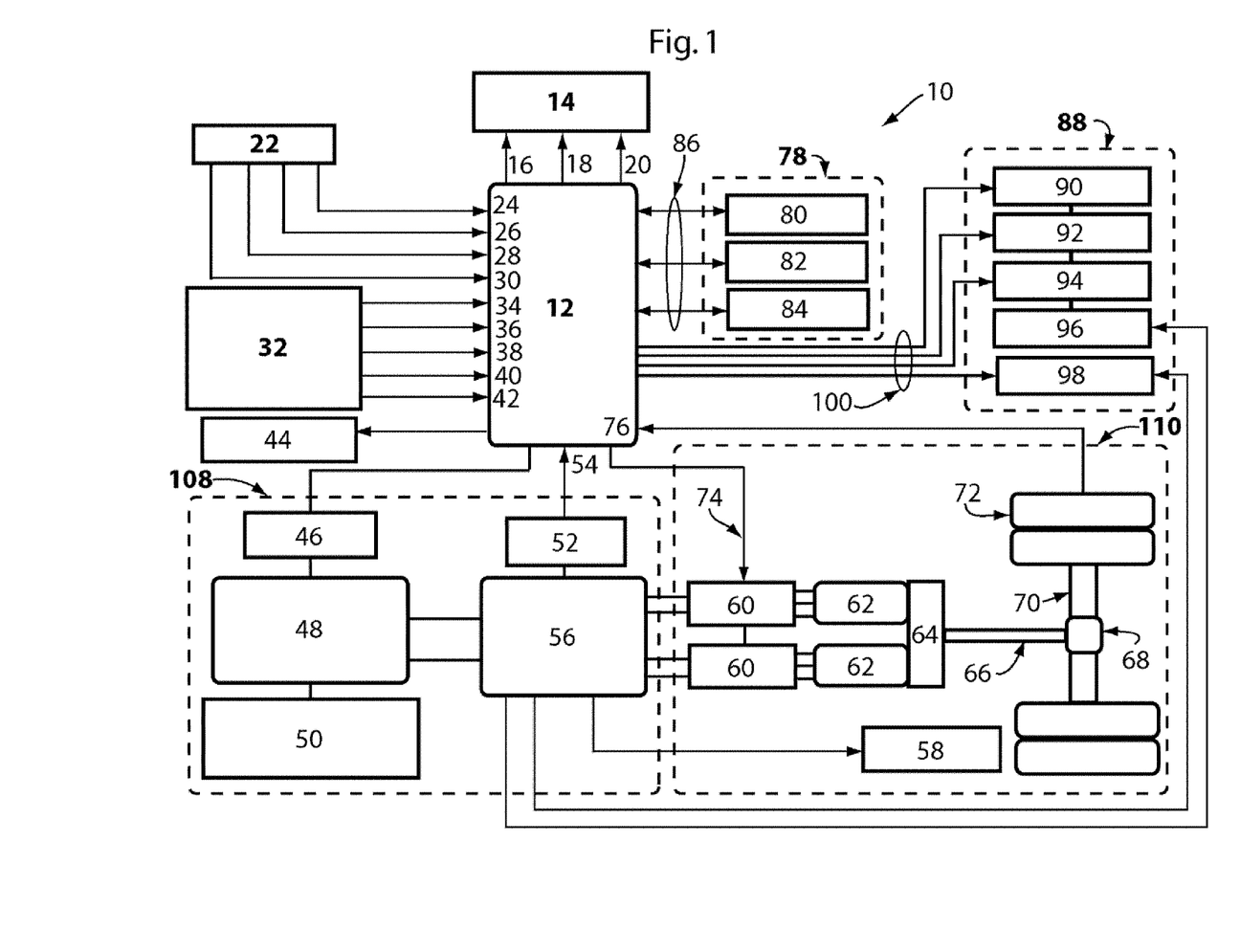
FIG. 1 diagrams the connections and interactions of the key elements of the disclosed electric vehicle power management & driver control system.

FIG. 1 shows the key elements of the Electric Vehicle Power Management & Driver Control System 10 which optimizes how an electric power system 108 energizes and governs an electric drivetrain 110 depending on external sensor parameters sent to a system controller 12. The system controller 12 receives data from various driver inputs 22, chassis/body sensors 32, and a vehicle speed sensor 76; and also exchanges data with a chassis electronic control module (ECM) 78; sends telemetry output 44; sends realtime operational data to a driver interface system 14; and sends control signals to the drivetrain 110 and vehicle accessories 88. Elements of each of these subsystems will now be identified below.

The Driver Interface System 14 comprising, for example a touch sensitive video display screen, provides the vehicle operator with realtime information on vehicle speed 16, system faults 18 and battery state of charge (SOC) 20. The Driver (generated) Inputs 22 include data from a PRND (gearshift position) Switch 24, Accelerator Position Sensor 26, Brake Sensor 28 and Route Selector 30. Chassis/Body Sensors 32 include Cabin/External Temperature Sensor(s) 34, Vehicle Mass Sensor(s) 36, Inclinometer(s) 38, Door Sensor(s) 40, and Global Positioning Sensor(s) (GPS) 42. In addition, the system controller 12 provides direct telemetry output 44 to external networks. The inclinometer can be, for example, a HPS Series Precision Inclinometer (HPS is a trademark of Level Developments Ltd.) or a Novotechnik RSC 3200 series Hall-effect angle sensor (Novotechnik is a trademark of Novotechnik U.S., Inc.). The mass sensor can be a Kiepe EGP 503 and 504 (Kiepe is a trademark of Vossloh Kiepe GmbH). The electronic weight transmitter in the Kiepe EGP converts mechanical pressure into electrical current to allow a vehicle's load to be determined from the state of its pneumatic suspension system. A piezoresistive sensor converts pressure at the appliance into an electrical signal. The downstream amplifier generates an output current linear to the pressure. The measuring signal between 4 and 20 mA correlates with the pressure as shown in the downstream electrical data. The zero offset of 4 mA permits the user to easily identify line interruption.

An alternative mechanical version for the mass sensor would be a Kiepe EGM, an electronic weight transducer that converts spring deflection into voltage and current signals. Loading levels of vehicles, equipped with mechanical spring suspension, can thus be measured. An electronic weight transducer is built into an aluminum casing, mounted to vehicle spring suspensions. A lever is connected to a shaft that converts the spring deflection as into a rotary motion. The oscillator produces an alternating voltage of constant amplitude. The voltage is transferred by means of a coupling coil. The coupling factor is varied by means of a metal tongue. The transferred alternating voltage is proportional to deflection Δs. The alternating voltage is then rectified, linearized, scaled and employed as voltage (4 . . . 10V) and current (4 . . . 10 mA) outputs. The electrical output signals are in the measuring range of the stroke linearly proportional to the deflection.

The Power System 108 is comprised of a Battery Management System (BMS) 46, a scalable traction Battery Pack 48, an External Charging Control System 50 (possible charging sources: induction, mains, generator, for example), and a Power Distribution Box 56. A scalable traction battery pack is a commercially available hardware and software system in which multi-cell rechargeable batteries are monitored and controlled to provide cell charge and discharge balancing and to provide battery information to external systems. A DC/DC Converter 52 supplies Low Voltage Power 54 to the System Controller 12 as well as key elements of the drivetrain 110.

The Drivetrain 110 includes a Brake Resistor(s) 58, Inverter(s) 60, AC Motor(s) 62, a Summation Gearbox 64, a Driveshaft 66, a Differential 68 gear hub, Driven Axle(s) 70, and Wheels 72. The System Controller 12 sends Motor Control Signals 74 to the inverters 60 to control motor 62 speeds. Alternatively, a DC (direct current electric) motor could be used in the drivetrain instead of an AC (alternating electric) motor, in which case inverters would not be needed for the electric motor. Vehicle speed data is digitized by a Vehicle Speed Sensor (VSS) 76 and sent back to the controller 12.

A Chassis Electronic Control Module (ECM) 78 includes controllers for an Antilock Braking System/Anti-Slip Regulation (ABS/ASR) 80, an Electronic Brake System/Electronic Stability Control (EBS/ESC) 82, and a Generator (ICE) 84, all of which exchange data with the system controller 12 by means of a J1939 Controller Area Network (CAN) 86 bus.

Vehicle Accessories (ACC) 88 include a Steering Pump 90, an Air Compressor 92, Heating 94, DC/AC Inverters 96, and HVAC-DC 98, all of which receive ACC Control Signals 100 from the System Controller 12. Also, the DC/AC Inverters 96 and HVAC DC 98 receive direct power from the Power Distribution Box 56.

Figure 2:
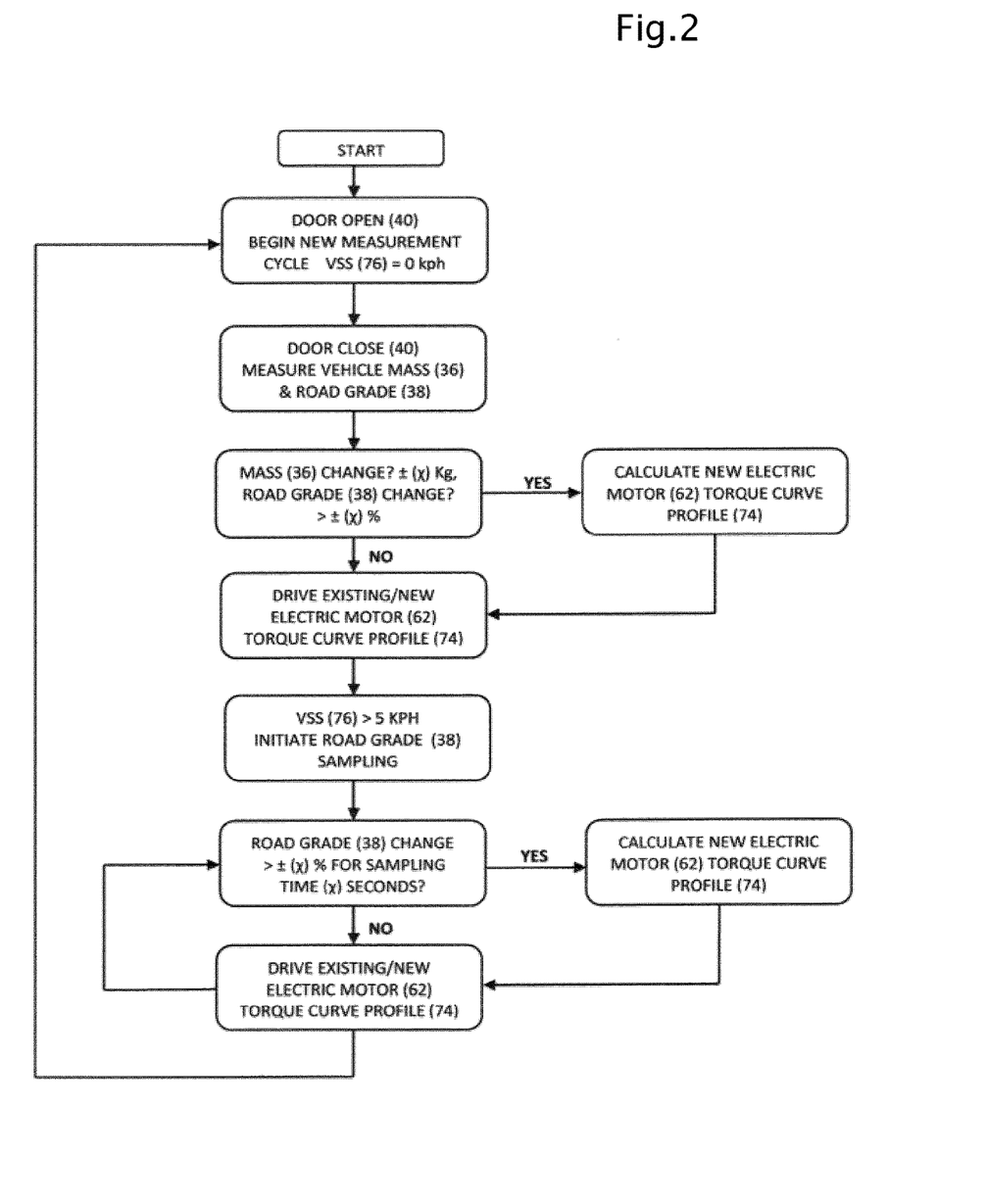
FIG. 2 diagrams the operation of the electric vehicle power management system.
Figure 3:
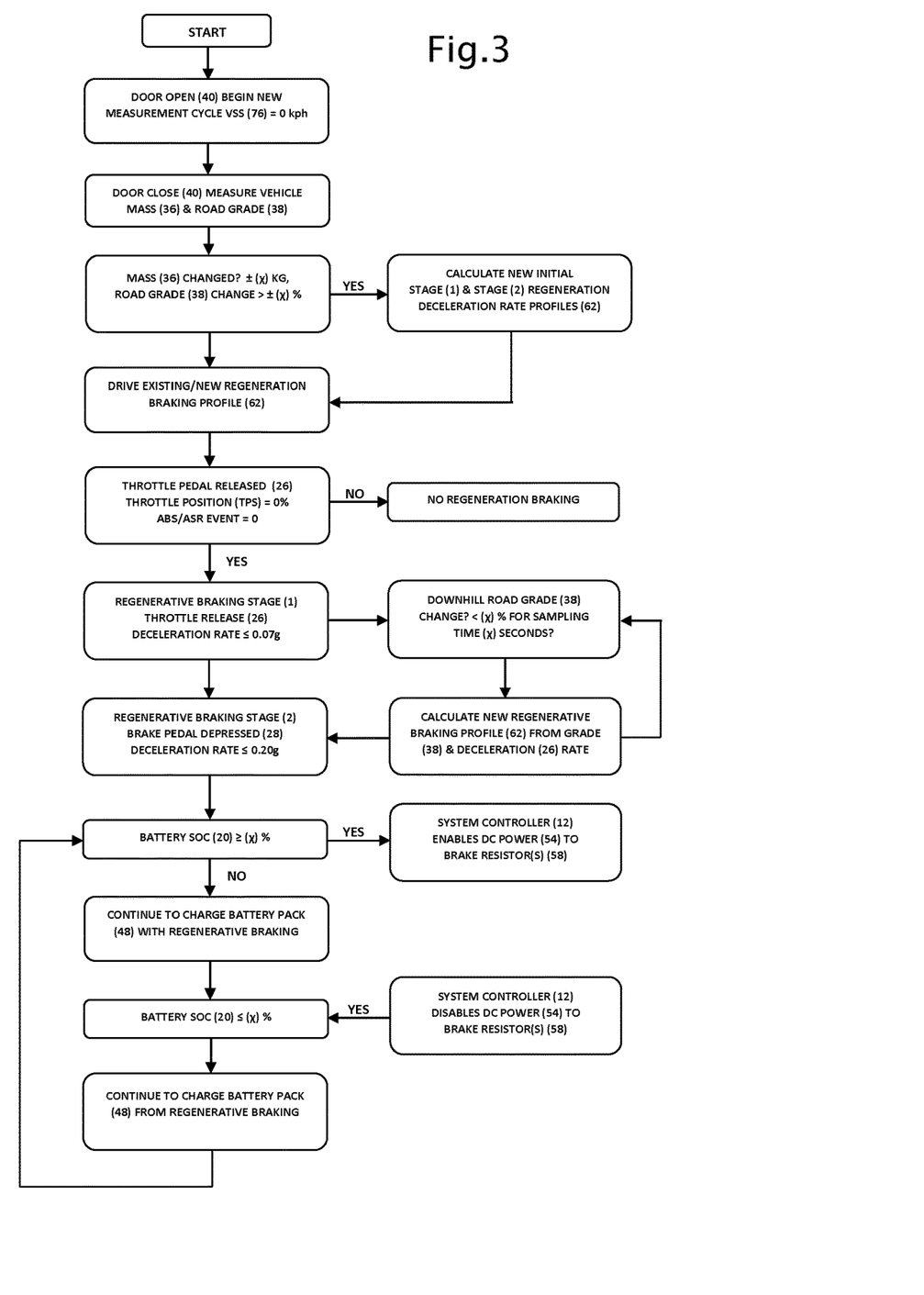
FIG. 3 diagrams the operation and interactions of the regenerative braking system with the electric vehicle power management system.
Figure 5:
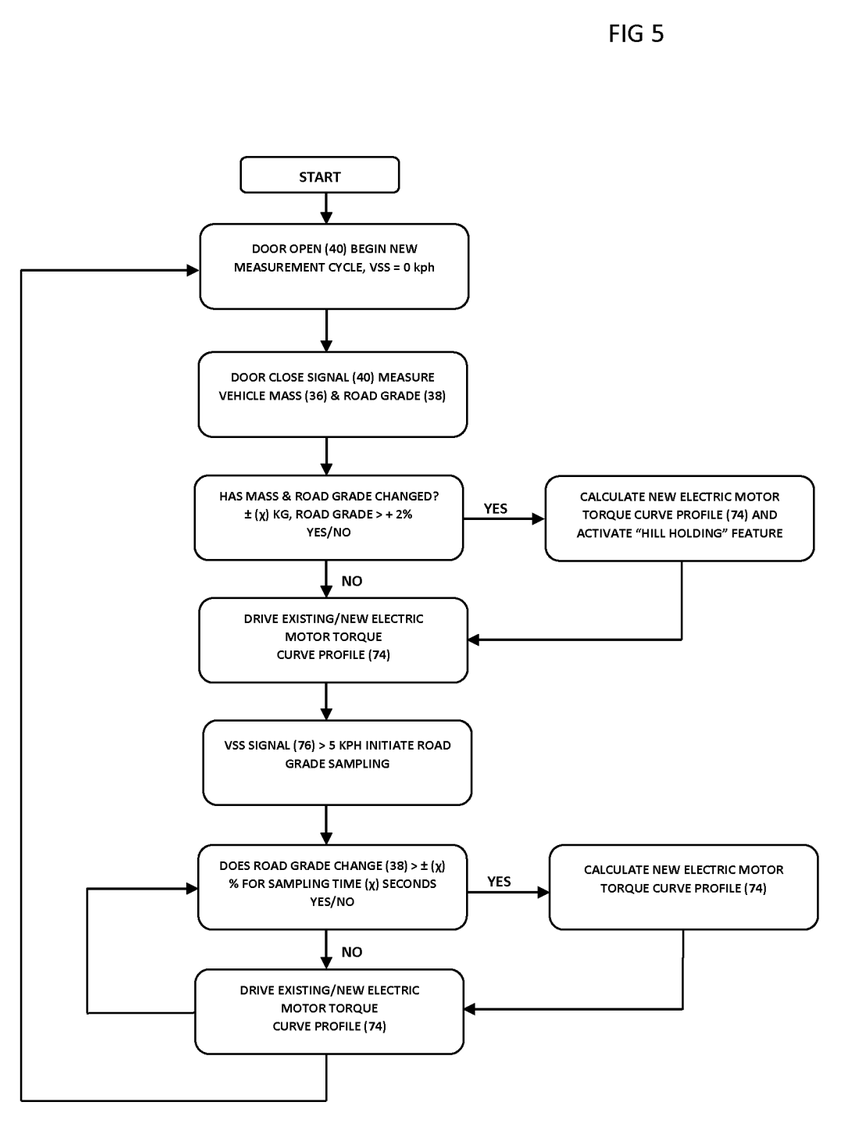
FIG. 5 diagrams the operation of the hill-holding subsystem.

FIGS. 2, 3 and 5 diagram functional aspects of the power management and regenerative braking systems respectively, and include bracketed numeric references to various elements disclosed in FIG. 1 from which data as indicated in the blocks of those Figures is derived.

Figure 4:
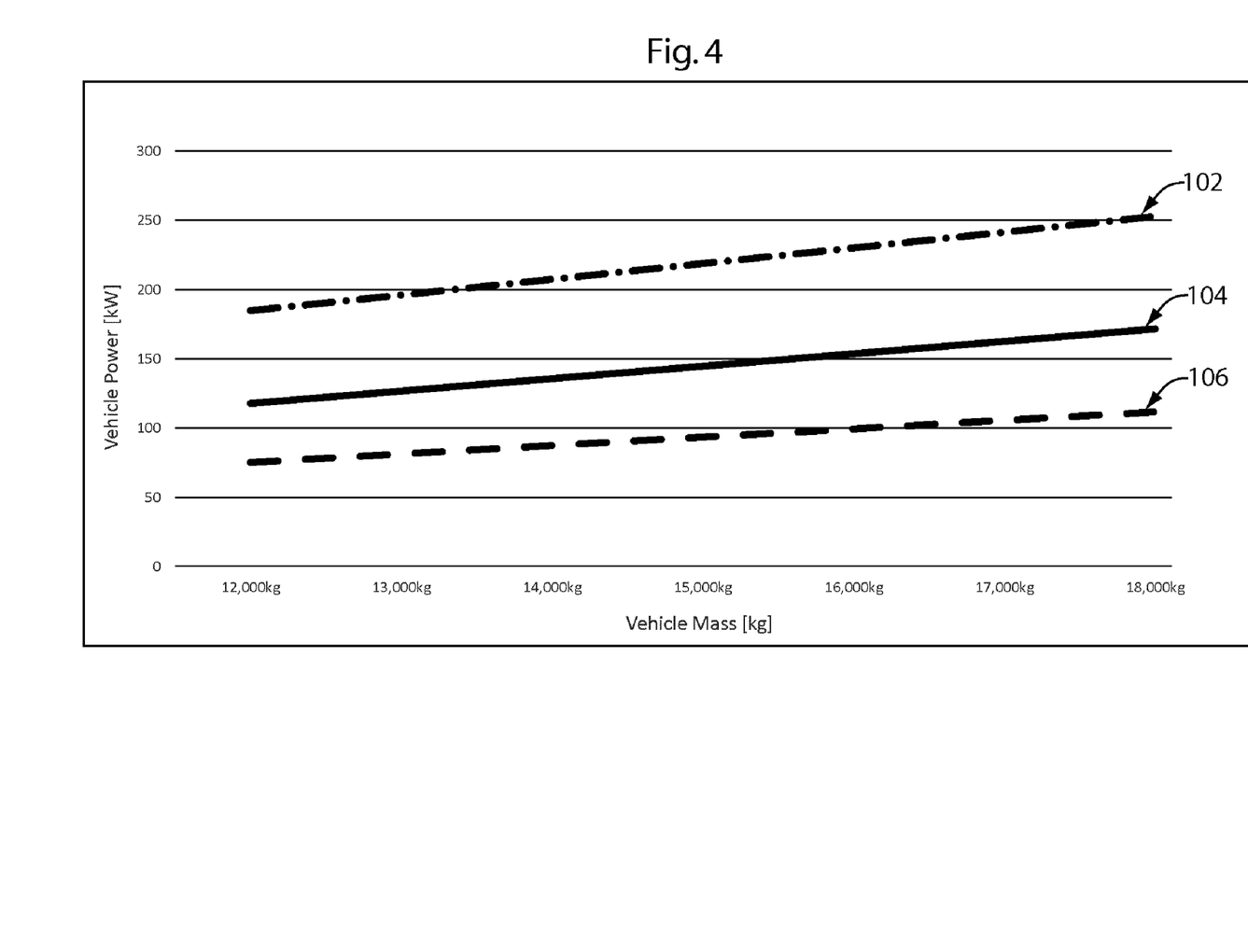
FIG. 4 is a graphical plot of representative road grade percentage curves for vehicle power consumption vs. vehicle mass.

FIG. 4 shows a graphical plot of vehicle power consumption vs. vehicle mass with curves for 3% Grade 102, 0% Grade 104, and −3% Grade 106. These latter figures will be explained in detail below.

A preferred embodiment of the Electric Vehicle Power Management & Driver Control System will now be described in detail. As outlined above, the primary factors affecting efficient use of battery power in full or serial hybrid electric vehicles include vehicle mass & road grade; vehicle speed & acceleration; recharging profile & braking, and use of vehicle accessories.

Adaptive Power Management: Basic Operational Principles

Adaptive power management is used while the vehicle is driving, for instance if the vehicle is driving downhill then the power requirements [kW] are substantially less and the power available can be scaled back further depending on the road grade measured by the inclinometer 38. As shown by the plot in FIG. 4, the power required to drive an electric vehicle up a 3% Grade 102 is substantially higher than 0% Grade 104, and substantially lower if driven down a −3% Grade 106. Also shown in FIG. 4 is the fact that more power is required to operate an electric vehicle as its mass increases, as measured by the vehicle mass sensor 36.

FIG. 2 demonstrates the basic operation of a representative transit vehicle employing the disclosed control system 10, wherein the system controller 12 records that the vehicle is stationary by sampling the vehicle speed sensor (VSS) 76, and that its door is open as indicated by the door sensor 40. As the door is closed, the status of the mass sensor 36 and inclinometer 38 are both sampled, and a motor 62 torque curve profile determining the magnitude of the motor control signal 74 is sent by the system controller 12 to the inverter 60 of each motor 62. By this means, the vehicle is operated at its optimal motoring power [kW] to ensure the maximum efficiency given the known conditions. As those conditions change, i.e. road grade 38 or vehicle speed 76, the torque curve profile to the motor(s) 62 is adjusted as shown.

FIG. 3 shows additional factors affecting how a battery pack is charged, and therefore how much motor power is available to the vehicle, demonstrating the basic operation of a representative transit vehicle employing the disclosed control system 10, wherein the system controller 12 records that the vehicle is stationary by sampling the vehicle speed sensor (VSS) 76, and that its door is open as indicated by the door sensor 40. A stationary and energized electric vehicle has its brake 28 on and ABS/ASR 80 inactive, and the accelerator position sensor 26 registering a 0% accelerator pedal position This data is passed to the system controller 12. As the door is closed, the status of the mass sensor 36 and inclinometer 38 are both sampled, and a motor 62 regeneration torque curve profile determining the magnitude of the motor control signal 74 for regenerative braking stage (1) (when the throttle is released), and then for regenerative braking stage (2) (when the brake pedal is depressed), is sent to the inverter 60 of each motor 62. By this means, the vehicle is operated at its optimal regeneration power [kW] to ensure the maximum efficiency given the known conditions. As those conditions change, i.e. road grade 38 or vehicle speed 76, the regeneration torque curve profile to the motor(s) 62 is adjusted as shown.

If the Brake Sensor 28 indicates the brake pedal is depressed while a vehicle is going downhill, the motor(s) 62 are used to slow the vehicle down, and also to generate power for the battery pack, a feature known as regenerative braking. Since the magnitude of regenerative braking needed to restore full charge to the battery pack is dependent on the Battery SOC 20, this is taken into account when determining an appropriate recharging profile. As shown, if the battery pack is below a selected charge level, power from regenerative braking will be available. However, if the battery pack is above the selected SOC 20, then the system controller 12 enables power to be shunted to brake resistors 58 which permits the excess power to be dissipated by heat convection or liquid cooling of said resistors.

Referring again to FIG. 3 regenerative braking can slow the vehicle and recharge the batteries at a consistent rate. During regenerative braking the system controller 12 increases or decreases regenerative braking torque linearly in response to a measured vehicle mass, a downhill road grade measured by the inclinometer 38 and any increase in acceleration due to gravity, toward maintaining a target constant deceleration rate and downhill speed seamlessly with interaction required from the driver other than his brake pedal or throttle pedal actions in response to the road situation for the vehicle. Regenerative braking that is managed by the digital electronic controller would thereby enhance the charging process. The accelerator position sensor 26 would detect when the throttle pedal is released by the driver and the brake Sensor 28 would detect when the brake pedal is depressed by the driver. The system controller 12 receives this data, and uses vehicle mass to activate and control at least one regenerative braking motor acting as a generator on a drivetrain for the vehicle. The same motor 62 as is used to power the drivetrain can function as a regenerative braking motor to send current back to the battery pack during braking. The system thus maximizes the amount of the power recovery of the vehicles kinetic energy to the energy storage device and the overall energy efficiency of the vehicle. The electronic controller would preferentially maintain a constant preselected deceleration rate for the vehicle that maximizes the amount of the return of kinetic energy of the vehicle to a battery pack by maximizing regenerative brake motor charging to the extent available from the combination of the regenerative braking motor and the service brakes ordinarily used to slow or halt the vehicle, all, subject to increased brake pedal depression calling for an increased deceleration rate. The electronic controller would for example maintain a target speed set by the speed of the vehicle at the time of throttle deactivation by the driver, and would increase firstly regenerative braking and only secondarily service brake application to reduce vehicle speed in response to increased brake pedal depression by the vehicle's driver. The digital electronic controller would thus signal a regenerative braking subsystem for the vehicle to become partially engaged upon a throttle pedal for the vehicle becoming completely released and would signal the regenerative braking subsystem to become maximally engaged prior to engagement of service brakes for the vehicle upon a brake pedal for the vehicle becoming depressed. The power management system's regenerative braking subsystem can thus enhance downhill braking and ensure vehicle safety while increasing power recovery.

Dynamic braking is the use of the electric traction motors of a vehicle as generators when slowing. The dynamic braking is termed rheostatic if the generated electrical power is dissipated as heat in brake grid resistors, and regenerative if the power is returned to the supply line. Referring again to FIG. 1, braking resistors 58 are connected to the power distribution box 56 and are activated by the system controller 12 switching solid-state control relay(s) ON or OFF during regenerative braking as shown in FIG. 3, the resistors 58 are utilized when the batteries reach (X) % SOC 20, where X is a predetermined charge level of said battery pack 48. The excess kinetic energy is then dissipated into the braking resistors 58. The braking resistors 58 can be either water or air-cooled. The braking resistor 58 water cooling system can be connected to either the generator 84 engine cooling circuit or the passenger cabin radiators. The use of braking resistors 58 also reduces the wear of the conventional braking and driveline components, which in turn decreases vehicle operational costs.

The regenerative braking commands are based on the battery SOC 20, preprogrammed route terrain (if known), vehicle mass 36 & road grade 38. The system 10 is able to circumvent any driver with a lead foot by not allowing them to accelerate the vehicle at its current measured mass beyond the acceleration rate of the vehicle at its GVWR over the course of its route. Some flexibility may be available by allowing the operator to select appropriate performance profiles or the timing and use of non-critical accessories 88. In addition, profiles may be used to select the most appropriate time to operate the generator such as when the bus is stationary vs. when the motor is in use. (less efficient) As this system can be used for commercial delivery, where the route may vary on the fly, optional profiles are anticipated.

The inclinometer 38 provides road grade information to the system controller 12 which determines if the "Hill Holding" feature shown in FIG. 5, should be enabled to prevent the vehicle from rolling backwards during the release of the brake and the application of the throttle pedal. This feature starts its cycle with a door open state changing to a door closed state, both states being read from the door sensor 40. Vehicle mass (determined by the system controller 12 from mass sensor 36) and road grade (determined by the system controller 12 from inclinometer 38) changes are used by the system controller 12 to calculate a new electric motor torque curve profile which determines the motor control signal 74 sent by the system controller 12. Subsequent changes to the motor control signal 74 within the features cycle are based on changes to the road grade as the vehicle's position changes. It is assumed that the vehicle's mass does not significantly change until the door sensor 40 indicates a door has opened, at which time passengers and cargo may embark or disembark, and a new cycle then starts for the hill-holding feature. Once, the vehicle mass and road grade angle has already been measured, it is simple for the system controller 12 to determine the torque required at the wheels to hold the vehicle on the incline during a transition from brake off to throttle on.

The "Hill Holding" feature does not require the vehicle operator to depress the accelerator pedal to demand additional wheel torque because the desired "Hill Holding" wheel torque will be positive and will be reduced with increasing vehicle speed.

The "Hill Holding" feature can be manually turned on or off and its default state it will apply the torque required at the wheels on grades equal to or greater than 2% to hold the vehicle on the incline during the transition from brake off to throttle on for two seconds preventing roll back.

The foregoing description of the preferred apparatus and method of operation should be considered as illustrative only, and not limiting. Other techniques and other materials may be employed towards similar ends. Various changes and modifications will occur to those skilled in the art, without departing from the true scope of the invention as defined in the above disclosure, and the following general claims.

The invention claimed is:

1. An adaptive power management and driver control system for modifying electric vehicle drive output in real time, comprising:
    a) input sensors mounted on a vehicle that measure a plurality of conditions for the vehicle from among i) vehicle mass, ii) road grade, iii) vehicle speed, iv) vehicle acceleration, and v) door position;
    b) a digital electronic controller, mounted on the vehicle, that:
        i) receives data from the input sensors, runs an algorithm using the data, and outputs resulting energy efficient power output commands to an electric motor for the vehicle;
        ii) receives input from a brake pedal for the vehicle and activates a regenerative braking system, detects a state of charge of a battery pack for the vehicle, calculates an appropriate recharging profile, activates regenerative braking if the state of charge of the battery pack is below a selected charge level, and shunts power to a brake resistor if the state of charge of the battery pack is above a selected charge level.

2. The adaptive power management and driver control system of claim 1, in which:
    a) the sensors measure at least vehicle mass and road grade;
    b) vehicle mass and road grade are measured as a door of the vehicle closes and the algorithm calculates a new power output for the electric vehicle motor based on the vehicle mass and road grade;
    c) in which continual new power outputs are calculated on the fly as the vehicle moves and the road grade changes.

3. The adaptive power management and driver control system of claim 1, in which:
    a) the energy efficient power output commands limit power available to a drivetrain for the vehicle, regardless of the vehicle's actual load, to a level of power that would provide acceleration of the vehicle if it were loaded at its GVWR;
    b) a subsequent power algorithm calculation provides an increased power output command over a previous power output when the vehicle encounters an uphill grade that requires more power for the vehicle to maintain a desired speed on the uphill grade and provides a decreased power output command over a previous power output when the vehicle encounters a downhill grade that requires less power for the vehicle to maintain a desired speed on the downhill grade;

c) the system includes a hill-holding subsystem to prevent the vehicle from rolling backwards during the release of the brake and the application of the throttle pedal.

4. The adaptive power management and driver control system of claim 1, in which the digital electronic controller is based on a distributed network with multiplexing capabilities.

5. The adaptive power management and driver control system of claim 1, in which the sensors include at least one vehicle mass sensor from which vehicle mass is calculated and an inclinometer from which road grade is calculated.

6. The adaptive power management and driver control system of claim 1, further comprising a video display of sensor data and power output level to display information to a driver for the vehicle, and the video display shows information on vehicle speed, system faults and battery state of charge.

7. The adaptive power management and driver control system of claim 1, comprising:
 a) a gearshift position switch, an accelerator pedal position sensor, and a brake sensor, which provide data to the digital electronic controller;
 b) a door position sensor, a cabin temperature sensor, and an external temperature sensor; and
 c) a route selector and a Global Positioning Sensor, in which the digital electronic controller provides direct telemetry output to an external network.

8. The adaptive power management and driver control system of claim 1, comprising a battery management subsystem and a battery pack, in combination with a charger that supplies charging electrical current to the battery pack from an electrical power source external to the vehicle.

9. The adaptive power management and driver control system of claim 1, in which the vehicle has a drivetrain that includes a brake resistor, either a DC motor or an inverter and AC motor, a summation gearbox, and the digital electronic controller sends motor control signals to control motor speed, and has a vehicle speed sensor that digitizes vehicle speed data and feeds digitized vehicle speed data back to the digital electronic controller.

10. The adaptive power management and driver control system of claim 1, further comprising a chassis electronic control module that controls a plurality of subsystems from among a) an antilock braking system, b) an anti-slip regulation, c) an electronic brake system, d) an electronic stability control and e) an internal combustion engine electrical generator, and that exchanges data with the digital electronic controller via a controller area network bus, and comprising DC/AC inverters and HVAC system, all of which receive control signals from the digital electronic controller.

11. The adaptive power management and driver control system of claim 1, in which the digital electronic controller calculates that the vehicle is stationary by sampling a vehicle speed sensor, notes that a door of the vehicle is open as indicated by a door position sensor, notes that the door is closed when indicated by the door position sensor, samples a vehicle mass sensor and inclinometer upon noting that a door position has changed from open to closed, and calculates an energy efficient motor torque curve profile that determines a magnitude for a motor control signal in a drivetrain of the vehicle.

12. The adaptive power management and driver control system of claim 1, in which the digital electronic controller detects if the brake pedal is depressed while the vehicle is calculated from an inclinometer to be going downhill, and then activates at least one motor acting as a generator on a drivetrain for the vehicle to simultaneously slow the vehicle down and generate power to a battery pack for the vehicle.

13. The adaptive power management and driver control system of claim 1, in which activation inputs for the braking resistors are connected to a power distribution box and are activated by the digital electronic controller switching at least one solid-state control relay, output cooling circuits for the brake resistors are connected to at least one of a generator engine cooling radiator and a cabin-heating radiator, and regenerative braking is managed by the digital electronic controller continually weighing the vehicle via the mass sensor, and increasing a regeneration rate to maintain a preselected deceleration rate for the vehicle.

14. The adaptive power management and driver control system of claim 1, in which:
 a) the digital electronic controller signals a regenerative braking subsystem for the vehicle to become partially engaged upon a throttle pedal for the vehicle becoming completely released and signals the regenerative braking subsystem to become maximally engaged prior to engagement of service brakes for the vehicle upon a brake pedal for the vehicle becoming depressed; and
 b) the digital electronic controller maintains a constant deceleration rate for the vehicle while maximizing the amount of the return of kinetic energy of the vehicle to a battery pack by regenerative brake motor charging available from the deceleration rate, upon a brake pedal being depressed, subject to increased depression of the brake pedal.

15. The adaptive power management and driver control system of claim 3, in which:
 a) activation of at least one of ABS and ASR braking systems overrides regenerative braking;
 b) the digital electronic controller adjusts torque curve and regenerative braking profiles with algorithms depending on battery state of charge, preprogrammed route terrain, vehicle mass, and road grade;
 c) the digital electronic controller receives road grade data from an inclinometer mounted on the vehicle and calculates whether to activate the hill-holding subsystem, uses data from a vehicle mass sensor to calculate a vehicle mass, calculates a level of torque required by the vehicle mass and road grade, and sends power output commands to a motor sufficient to hold the vehicle from moving backward on the road grade during a transition from brake pedal off to throttle pedal on.

16. The adaptive power management and driver control system of claim 2, in which:
 a) the sensors include at least one vehicle mass sensor from which vehicle load is calculated and an inclinometer from which road wade is calculated, and continual new power outputs are calculated on the fly as the vehicle moves and the road grade changes;
 b) the energy efficient power output commands limit power available to a drivetrain for the vehicle, regardless of the vehicle's actual load, to a level of power that would provide acceleration of the vehicle if it were loaded at its GVWR, subject to a subsequent power algorithm calculation providing an increased power output command over a previous power output when the vehicle encounters an uphill grade that requires more power for the vehicle to maintain a desired speed on the uphill grade and provides a decreased power output command over a previous power output when the vehicle encounters a downhill grade that requires less power for the vehicle to maintain a desired speed on the downhill grade.

17. The adaptive power management and driver control system of claim 16, comprising a gearshift position switch, an accelerator pedal position sensor, and a brake sensor, which provide data to the digital electronic controller, in which the digital electronic controller detects if the brake pedal is depressed while the vehicle is calculated from an inclinometer to be going downhill, and then activates at least one motor acting as a generator on a drivetrain for the vehicle to simultaneously slow the vehicle down and generate power to a battery pack for the vehicle.

18. The adaptive power management and driver control system of claim 17, comprising:
    a) a door position sensor, a cabin temperature sensor, and an external temperature sensor;
    b) a route selector and a Global Positioning Sensor;
    c) a battery management subsystem and a battery pack;
    d) a charger that supplies charging electrical current to the battery pack from an electrical power source external to the vehicle;
    e) a drivetrain that includes a brake resistor, an electric motor, and the digital electronic controller sends motor control signals to control motor speed;
    f) a vehicle speed sensor that digitizes vehicle speed data and feeds digitized vehicle speed data back to the digital electronic controller;
    g) a chassis electronic control module that controls a plurality of subsystems from among i) an antilock braking system, ii) an anti-slip regulation, iii) an electronic brake system, iv) an electronic stability control and v) an internal combustion engine electrical generator, and that exchanges data with the digital electronic controller via a controller area network bus;
    h) an HVAC system which receives air conditioning control signals from the digital electronic controller; in which the digital electronic controller calculates that the vehicle is stationary by sampling a vehicle speed sensor, notes that a door of the vehicle is open as indicated by a door position sensor, notes that the door is closed when indicated by the door position sensor, samples a vehicle mass sensor and inclinometer upon noting that a door position has changed from open to closed, and calculates an energy efficient motor torque curve profile that determines a magnitude for a motor control signal for an electric motor in a drivetrain of the vehicle.

19. The adaptive power management and driver control system of claim 18, in which:
    a) the digital electronic controller detects a state of charge of a battery pack for the vehicle, calculates an appropriate recharging profile, activates regenerative braking if the state of charge of the battery pack is below a selected charge level, and shunts power to a brake resistor(s) if the state of charge of the battery pack is above a selected charge level;
    b) activation inputs for the braking resistor are connected to a power distribution box and are activated by the digital electronic controller switching at least one solid-state control relay, and an output cooling circuit for the brake resistor is connected to at least one of a generator engine cooling radiator and a cabin heating radiator:
    c) the digital electronic controller adjusts torque curve and regenerative braking profiles with algorithms depending on battery state of charge, preprogrammed route terrain, vehicle mass, and road grade;
    d) the digital electronic controller receives road grade data from an inclinometer mounted on the vehicle and calculates whether to activate the hill-holding subsystem, uses data from a vehicle mass sensor to calculate a vehicle mass, calculates a level of torque required by the vehicle mass and road grade, and sends power output commands to a motor sufficient to hold the vehicle from moving backward on the road grade during a transition from brake pedal off to throttle pedal on.

20. The adaptive power management and driver control system of claim 19, in which:
    a) regenerative braking is managed by the digital electronic controller continually weighing the vehicle via the mass sensor, and increasing a regeneration rate to maintain a preselected deceleration rate for the vehicle;
    b) the digital electronic controller signals a regenerative braking subsystem for the vehicle to become partially engaged upon a throttle pedal for the vehicle becoming completely released and signals the regenerative braking subsystem to become maximally engaged prior to engagement of service brakes for the vehicle upon a brake pedal for the vehicle becoming depressed;
    c) the digital electronic controller maintains a constant deceleration rate for the vehicle while maximizing the amount of the return of kinetic energy of the vehicle to a battery pack by regenerative brake motor charging available from the deceleration rate, upon a brake pedal being depressed, subject to increased depression of the brake pedal;
    d) activation of at least one of ABS and ASR braking systems overrides regenerative braking for the vehicle.

* * * * *